US005387019A

United States Patent [19]

Britzke, II

[11] Patent Number: 5,387,019

[45] Date of Patent: Feb. 7, 1995

[54] DRILL HANDLING TOOL

[75] Inventor: Robert W. Britzke, II, Rogers, Ark.

[73] Assignee: Rogers Tool Works, Inc., Rogers, Ark.

[21] Appl. No.: 160,726

[22] Filed: Dec. 2, 1993

[51] Int. Cl.[6] .......... B25B 9/02; B25J 15/12

[52] U.S. Cl. .......... 294/2; 294/99.2

[58] Field of Search .......... 294/2, 3, 19.1, 24, 294/33, 99.1, 99.2, 104, 118; 7/125, 127, 128; 29/278, 280, 283; 81/3.8, 44, 427

[56] References Cited

U.S. PATENT DOCUMENTS

| | | | |
|---|---|---|---|
| D. 324,984 | 3/1992 | Massey . | |
| 205,021 | 6/1878 | Whightsil | 294/3 X |
| 1,429,852 | 9/1922 | Dyer et al. | 81/3.8 |
| 1,481,517 | 1/1924 | Kurz | 81/3.8 |
| 3,161,085 | 12/1964 | Pratt | 81/3.8 |
| 3,215,006 | 11/1965 | Urani | 81/3.8 |
| 3,282,137 | 11/1966 | Lovelace | 294/99.2 X |
| 3,384,408 | 5/1968 | Furzey | 294/65.5 |
| 3,559,515 | 2/1971 | Kyser | 294/99.2 X |
| 3,628,824 | 12/1971 | Leuw et al. | 294/99.2 |
| 3,654,824 | 4/1972 | Reed | 81/3.8 |
| 3,817,078 | 6/1974 | Reed et al. | 294/99.2 X |
| 4,079,765 | 3/1978 | Hatayan | 294/99.2 X |
| 4,141,138 | 2/1979 | Quick | 294/99.1 X |
| 4,226,459 | 10/1980 | Natalicio | 294/99.2 |
| 4,841,819 | 6/1989 | Williams | 81/3.8 |
| 4,938,514 | 7/1990 | D'Addezio | 294/99.2 |

FOREIGN PATENT DOCUMENTS

| | | | |
|---|---|---|---|
| 8903283 | 4/1989 | WIPO | 294/3 |

*Primary Examiner*—Johnny D. Cherry

*Attorney, Agent, or Firm*—Dickstein, Shapiro & Morin

[57] ABSTRACT

A gripping tool having a main body with a plurality of gripping ends. A first body arm is integral to and extends outward from the main body at one of the plurality of gripping ends. A first upper jaw is formed on the first body arm with a first clamping arm flexibly mounted to the first body arm by a pivot member. The first clamping arm has a first lower jaw formed thereon. Also, a method for grasping a tool by first applying a compressive force between a fixed arm and a clamping arm on one side of a pivot member to open a set of jaws on the opposite side of the pivot member. The open jaws are then moved in a direction perpendicular to the compressive force to arrange the open jaws around the shaft of a tool such that the tool is grasped when the compressive force is released.

20 Claims, 1 Drawing Sheet

DRILL HANDLING TOOL

BACKGROUND OF THE INVENTION

The present invention relates to a gripping tool. More particularly, the present invention relates to a gripping tool for handling drills and routers used in manufacturing printed circuit boards.

In the design and manufacture of printed circuit boards, it is necessary to employ cutting tools such as drills and routers having extremely small bore diameters. During the cutting process it has been found that frequent changing of these tools is necessary due in part to the need for changing tool diameters and as a result of wear and breakage of the tools.

Care is required while changing the cutting tools to prevent injury to the operator, who must deal with these small sharp tools, as well as the tools themselves which are brittle and easily damaged. While a need for a device which can be used to safely manipulate these cutting tools exists, it has thus far gone unsatisfied.

SUMMARY OF THE INVENTION

The present invention alleviates to a great extent the difficulties encountered in handling the drills and routers used in manufacturing printed circuit boards. This result is achieved by providing a gripping tool having a main body with a plurality of gripping ends. A first body arm is integral to and extends outward from the main body at one of the plurality of tool gripping ends. A first upper jaw is formed on the first body arm with a first clamping arm flexibly mounted to the first body arm by a pivot member. The first arm has a first lower jaw formed thereon.

In its process aspects, the present invention is achieved by a method for grasping a tool by first applying a compressive force between a fixed arm and a clamping arm on one side of a pivot member to open a set of jaws on the opposite side of said pivot member. The open jaws are then moved in a direction perpendicular to the compressive force to arrange the open jaws around the shaft of a tool such that the tool is grasped when the compressive force is released.

A primary object of the present invention is to achieve this result by utilizing a portable device having unibody construction which has more than one tool gripping end.

It is a further object of the present invention to provide a device which is capable of grasping tools with different diameters at each of its tool gripping ends.

Another object of the invention is to provide a gripping tool with a pocket clip to insure that it is readily portable.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF A PREFERRED EMBODIMENT

Figure 1:
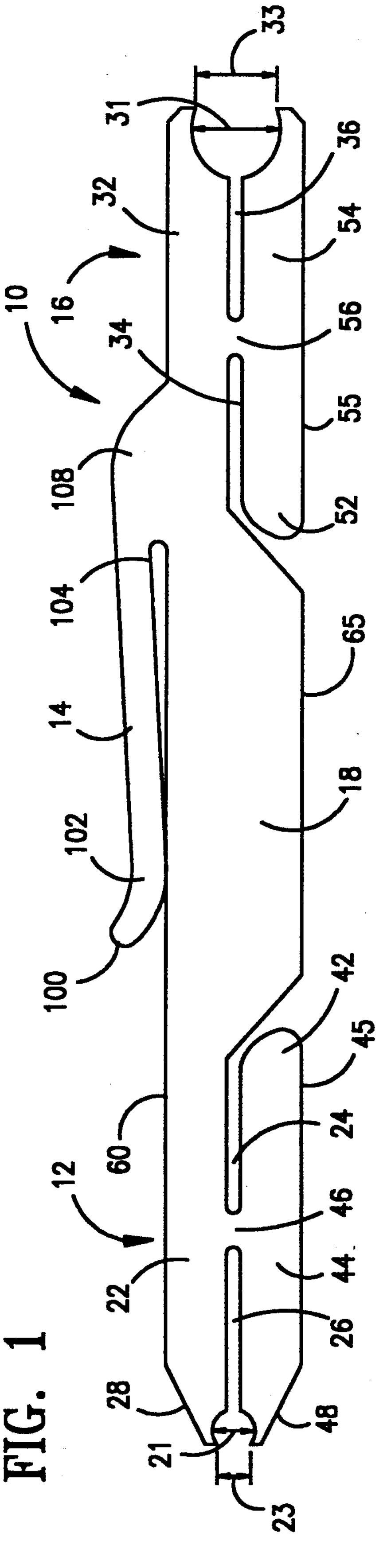
FIG. 1 is a side view of a gripping tool according to a preferred embodiment of the present invention.

Referring now to the figures, wherein like reference numerals indicate like elements, in FIG. 1 there is shown a gripping tool generally designated by reference numeral 10 in accordance with a preferred embodiment of the present invention. The gripping tool 10 includes a main body 18. A tool first gripping end 12 and a second tool gripping end 16 are integral to and extend outwardly from the main body 18. The gripping tool also includes a pocket clip 14 integral to the main body.

The first tool gripping end 12 has a first body arm 22 which is integral to and extends outwardly from the main body 18. Tool gripping end 12 also includes a first clamping arm 44. The arm 44 is joined to the first body arm 22 by a pivot member 46 which is located at or near the midpoint of the first body arm 22. A first inner channel opening 24 and a second first outer channel opening 26 are thereby formed between the first body arm 22 and the first clamping arm 44 on alternate sides of the pivot member 46.

Figure 2:
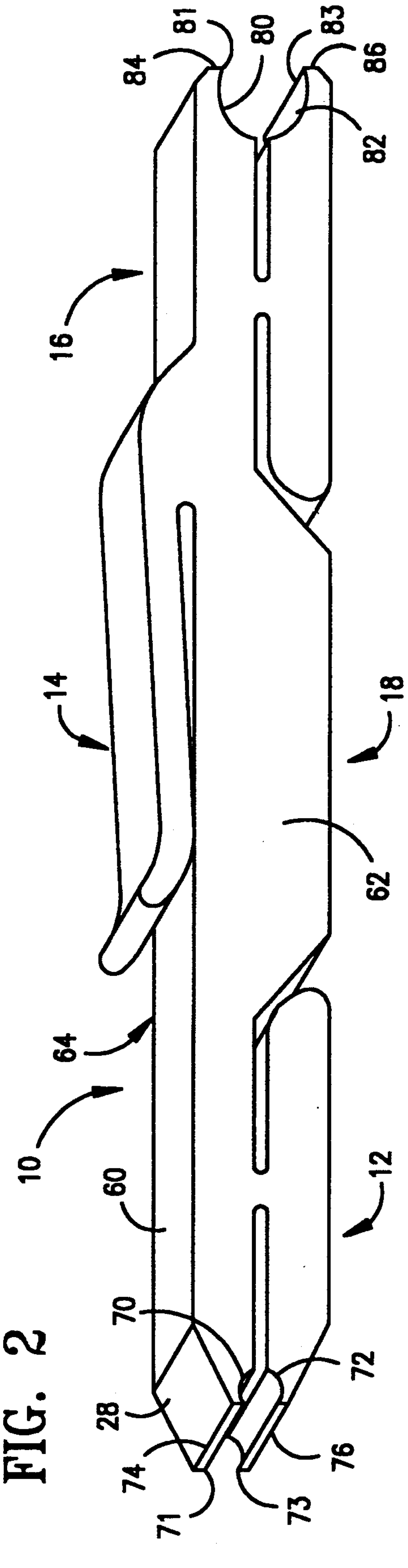
FIG. 2 is a perspective view of the gripping tool of FIG. 1.

Adjacent to the first outer channel opening 26 and displaced from the pivot member 46 is a first upper jaw 70 (FIG.2) formed on the first body arm 22 opposite to a first lower jaw 72 formed on the first clamping arm 44. An approximately semi-cylindrical cavity is thus formed between the first upper jaw 70 and the first lower jaw 72.

The gripping tool 10 has a first surface 62 and second surface 64 opposite the first surface 62 which are flat along the length of the tool. A first edge surface 60 is formed along a portion of the tool perpendicular to the first and second surfaces 62, 64. A second edge surface 65 is formed parallel to the first edge surface 60 over a relatively smaller portion of the tool length than the first edge surface 60. The first and second edge surfaces 60, 65 and first and second surfaces 62, 64 define the outer boundaries of the main body 18.

The arm 44 has an outer edge surface 45 which is generally coplanar with the second edge surface 65 of the main body. Applying a compressive force between the first edge surface 60 of the main body and the outer edge surface 45 of the first clamping arm 44 at its the distal end 42 will cause the pivot member 46 to flex and elastically deform, spreading the first upper jaw 70 and first lower jaw 72. A drill or other tool having a cylindrical shaft may then be inserted between the first upper jaw 70 and the first lower jaw 72. By releasing the compressive force between the outer edge surface 45 of the first clamping arm 44 and the first edge surface 60 of the main body 18, the jaws will spring back to close and securely hold a tool, having an appropriate shaft diameter which has been inserted between the jaws.

The first jaw opening width 23 measured between the first lower lip 73 formed on the first lower projecting edge 76 of the first clamping arm 44 and the first upper lip 71 formed on the first upper projecting edge 74 of the first body arm 22 is smaller than the first opening width 21 measured between the first upper jaw 70 and the first lower jaw 72. This disparity in width insures that the tool shaft to be gripped will be held securely between the jaws.

For example, the first opening width may be designed to securely grip a 0.124 diameter pin. This diameter will securely grip the 0.125 diameter portion of circuit board drills and routers.

The first gripping end 12 is provided with a tapered edge 28 on the first tool body arm 22 and a second tapered end 48 on the first clamping arm 44. The tapered first gripping end 12 facilitates the selection and grasping of individual tools which are ordinarily provided in rowed sets having minimal clearance between each tool. The tapered end 12 also allows for easier insertion of the tool 10 into a pocket thereby facilitating storage of the tool 10.

A second tool gripping end 16 is also provided having a second body arm 32 which is integral to and extends outwardly from the main body 18. A second clamping arm 54 having an outer edge surface 55 which is coplanar with the second edge of the main body 18, is joined to the second body arm 32 by a pivot member 56 which is located at or near the midpoint of the first body arm 32. A second inner channel opening 34 and a second outer channel opening 36 are thereby formed between the second body arm 32 and the second clamping arm 54 on alternate sides of the pivot member 56.

Adjacent to the second outer channel opening 36 and displaced from the pivot member 56 is a second upper jaw 80 (FIG. 2) formed on the second body arm 32 opposite to a second lower jaw 82 formed on the second clamping arm 54. An approximately semi-cylindrical cavity is thus formed between the upper jaw 80 and the lower jaw 82.

Applying a compressive force between the pocket clip mount 108 and the outer edge surface 55 of the second clamping arm 54 at its distal end 52 will cause the pivot member 56 to flex, spreading the second upper jaw 80 and second lower jaw 82. A tool having a cylindrical shaft may then be inserted between the second upper jaw 80 and the second lower jaw 82. By releasing the compressive force between the outer edge surface 55 of the second clamping arm 54 and the pocket clip mount 108, the jaws will close and securely hold a tool of an appropriate shaft diameter between the jaws.

The second jaw opening width 33 measured between the second lower lip 83 formed on the second lower projecting edge 86 of the second clamping arm 54 and the second upper lip 81 formed on the second upper projecting edge 84 of the second body arm 32 is smaller than the second opening width 31 measured between the second upper jaw 80 and the second lower jaw 82. This disparity in width insures that the tool shaft to be gripped will be held securely between the jaws.

The second opening width may be designed to securely grip a 0.176 diameter pin. This diameter corresponds to that of the depth setting rings which are frequently used in conjunction with circuit board drills and routers.

The pocket clip 14 is positioned on the first edge surface 60 and includes a pocket clip mount 108. The pocket clip 14 includes an arm 102 extending from the pocket clip mount 108 along the surface 60 from a secured end 104 to a distal end 100. The distal end 100 of the pocket clip 14 flares away from the first edge surface 60 of the main body 18.

The gripping tool may be securely clipped onto a shirt pocket or other material of suitable thickness by forcing the material between the pocket clip arm 102 and main body 18. The flared end 100 of the pocket clip 14 acts to guide the material between the pocket clip 14 and the main body 18.

In a preferred embodiment of the invention the drill handling tool 10 may be molded as a single unit. The material used to form the tool 10 must resist plastic deformation of the pivot members 46 and 56 when the jaws are open but be sufficiently resilient to securely grasp the desired object when the jaws are released. One material which may be used to form the tool is CELCON.

The above description and drawings are only illustrative of preferred embodiments which achieve the objects, features and advantages of the present invention, and it is not intended that the present invention be limited thereto. Any modifications of the present invention coming within the spirit and scope of the following claims are to be considered part of the present invention.

What is claimed as new and desired to be protected by Letters Patent of the United States is:

1. A gripping tool comprising:
- a main body having a plurality of tool gripping ends;
- a first body arm integral to and extending outwardly from said main body at a first tool gripping end, said first body arm being substantially parallel to said main body;
- a first upper jaw formed on said first body arm;
- a first clamping arm flexibly mounted to said first body arm by a first pivot member;
- a first lower jaw formed on said first clamping arm;
- a first outer channel formed between said first body arm and said first clamping arm, extending from said first pivot member to said first upper and lower jaws; and
- a first inner channel formed between said first body arm and said first clamping arm, extending from said first pivot member away from said first upper and lower jaws.

2. A gripping tool according to claim 1, further comprising a second body arm integral to and extending outwardly from said main body at a second tool gripping end, said second body arm being substantially parallel to said main body;
- a second upper jaw formed on said second body arm;
- a second clamping arm flexibly mounted to said second body arm by a second pivot member;
- a second lower jaw formed on said second clamping arm;
- a second outer channel formed between said second body arm and said second clamping arm, extending from said second pivot member to said second upper and lower jaws; and
- a second inner channel formed between said second body arm and said second clamping arm, extending from said second pivot member away from said second upper and lower jaws.

3. A gripping tool according to claim 2, wherein said first upper and lower jaws and said second upper and lower jaws are arcuate shaped, thus forming between them, respectively, first and second generally semi-cylindrical openings.

4. A gripping tool according to claim 3, wherein at least one of said generally semi-cylindrical openings has a predetermined width.

5. A gripping tool according to claim 3, wherein each of said generally semi-cylindrical openings has a different width.

6. A gripping tool according to claim 5, wherein one of said predetermined widths is sized to securely grasp an object having a shaft diameter of 0.124 inches.

7. A gripping tool according to claim 5, wherein one of said predetermined widths is sized to securely grasp an object having a shaft diameter of 0.176 inches.

8. A gripping tool according to claim 3, wherein at least one of said tool griping ends has tapered edges.

9. A gripping tool according to claim 3, wherein said main body includes a side edge surface, said first clamping arm includes a first outer edge surface, said second clamping arm includes a second outer edge surface, and said side edge surface, said first outer edge surface and said second outer edge surface are generally coplanar.

10. A gripping tool according to claim 2, further comprising a pocket clip coupled to said main body.

11. A gripping tool according to claim 1, wherein said tool is molded as a single unit.

12. A gripping tool according to claim 1, wherein said tool is formed from a resilient material which will resist plastic deformation of said first and second pivot members when said first and second upper and lower jaws are opened and will securely grasp an object when said jaws are closed.

13. A gripping tool according to claim 12, wherein said tool is formed from CELCON.

14. A gripping tool for gripping an object, comprising:

support means for supporting a plurality of tool gripping ends;

a first body arm integral to and extending outwardly from said support means, wherein said first body arm is substantially parallel to said support means;

a first upper jaw means formed on said first body arm, for gripping the object;

a first clamping arm;

a first lower jaw means, formed on said first clamping arm, for gripping the object;

a first pivot means for flexibly attaching said first clamping arm to said first body arm such that said first upper jaw means opposes said first lower jaw means;

a first outer channel formed between said first body arm and said first clamping arm, extending from said first pivot means to said first upper and lower jaw means; and a first inner channel formed between said first body arm and said first clamping arm, extending from said first pivot means away from said first upper and lower jaw means.

15. A gripping tool according to claim 14, further comprising a second body arm integral to and extending outwardly from said support means, wherein said second arm is substantially parallel to said support means;

second upper jaw means, formed on said second body arm, for gripping the object;

a second clamping arm;

second lower jaw means, formed on said second clamping arm, for gripping the object;

second pivot means for flexibly attaching said second clamping arm to said second body arm such that said second upper jaw means opposes said second lower jaw means;

a second outer channel formed between said second body arm and said second clamping arm, extending from said second pivot means to said second upper and lower jaw means; and a second inner channel formed between said second body arm and said second clamping arm, extending from said second pivot means away from said second upper and lower jaw means.

16. A gripping tool according to claim 15, wherein first and second generally semi-cylindrical shaped openings are formed between said first upper and lower jaw means and second upper and lower jaw meansrespectively.

17. A gripping tool according to claim 16, wherein each of said first and second generally semi-cylindrical openings has a different predetermined width.

18. A gripping tool according to claim 17, wherein one of said predetermined widths is sized to securely grasp an object having a shaft diameter of 0.124 inches.

19. A gripping tool according to claim 17, wherein one of said predetermined widths is sized to securely grasp an object having a shaft diameter of 0.176 inches.

20. A gripping tool according to claim 14, further comprising clip means, coupled to said support means, for facilitating storage of said tool.

* * * * *